United States Patent [19]

Kucera

[11] 4,076,137
[45] Feb. 28, 1978

[54] LARGE ROUND BALE HANDLING APPARATUS

[75] Inventor: Joseph Benedict Kucera, Traer, Iowa

[73] Assignee: Rudolph L. Lowell, Des Moines, Iowa ; a part interest

[21] Appl. No.: 711,967

[22] Filed: Aug. 5, 1976

[51] Int. Cl.² ............................................. B60P 3/00
[52] U.S. Cl. .................................... 214/394; 214/506
[58] Field of Search ................. 214/394, DIG. 4, 390, 214/392, 506, 505; 280/472, 473, 467, 490 R, 405 R

[56] References Cited

U.S. PATENT DOCUMENTS

| 1,244,783 | 10/1917 | Ruckes | 214/392 |
| 2,892,659 | 6/1959 | Francois | 280/405 R |
| 2,897,989 | 8/1959 | Hounsell | 214/390 |
| 3,523,410 | 8/1970 | Taylor et al. | 280/473 |
| 3,670,822 | 6/1972 | Reinhardt | 280/405 R |

FOREIGN PATENT DOCUMENTS 1,948,051  4/1971  Germany .............................. 214/394

Primary Examiner—Lawrence J. Oresky
Assistant Examiner—Lawrence E. Williams
Attorney, Agent, or Firm—Rudolph L. Lowell

[57] ABSTRACT

The device for handling large round bales includes an elongated frame having a pair of transversely spaced longitudinal side ramps movable to a lowered position below opposite side portions of a ground supported bale and engageable with such side portions to load the bale when the frame is elevated. One side of the frame is connectable to a tractor to provide for an unobstructed bale passage means between the side ramps. Bales can be successively loaded on the ramps, and then successively unloaded while moving the bale handling device in a forward direction.

4 Claims, 13 Drawing Figures

LARGE ROUND BALE HANDLING APPARATUS

SUMMARY OF THE INVENTION

The bale handling device of the present invention can load, transport and unload several large round bales while being towed in a forward direction only, thereby minimizing and considerably simplifying the tractor manipulation required for handling the large bales. A pair of transversely spaced bale supporting ramps are movable in a forward direction to a position below opposite sides of a ground supported bale and can be elevated to lift the bale off the ground for transport. Upon lowering the ramps to return the bale to ground engagement, the ramps are again movable in a forward direction away from the bale to unload it. Hitch means are connected to the device at an off center position so as not to obstruct the bale passage zone longitudinally of and between the ramps.

DESCRIPTION OF THE PREFERRED EMBODIMENT

Figure 1:
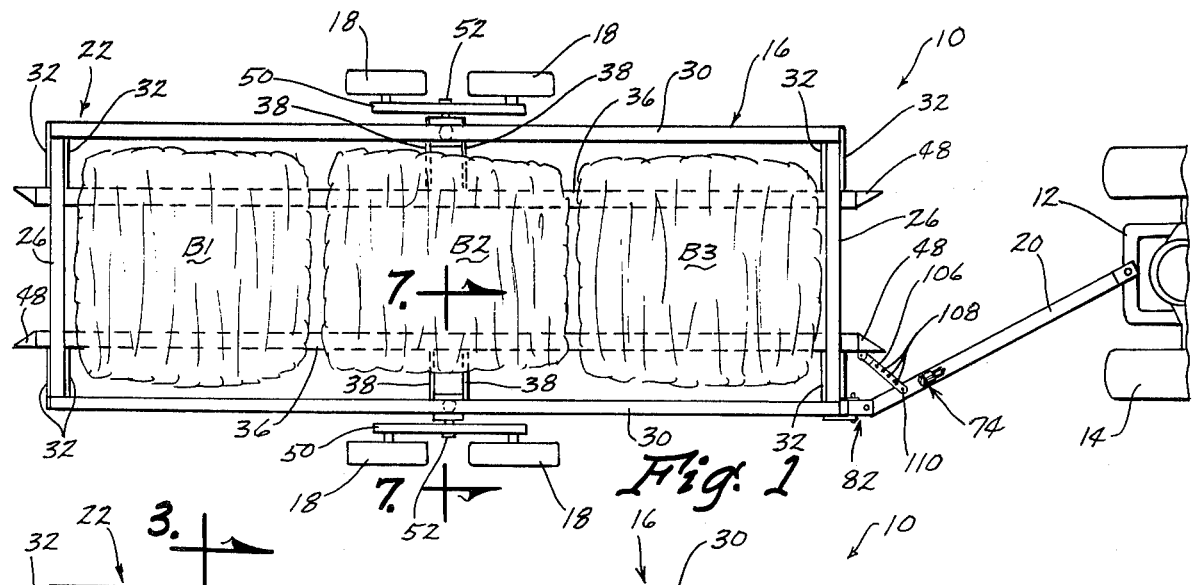
FIG. 1 is a top plan view of the bale handling apparatus of this invention shown in assembly relation with the draw bar of a tractor.
Figure 2:
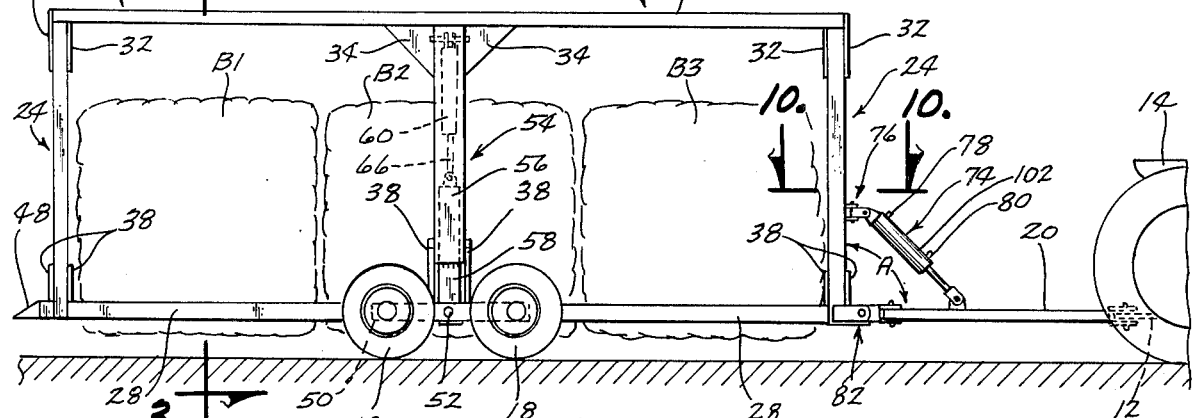
FIG. 2 is a side elevational view of the assembly shown in FIG. 1.
Figure 3:
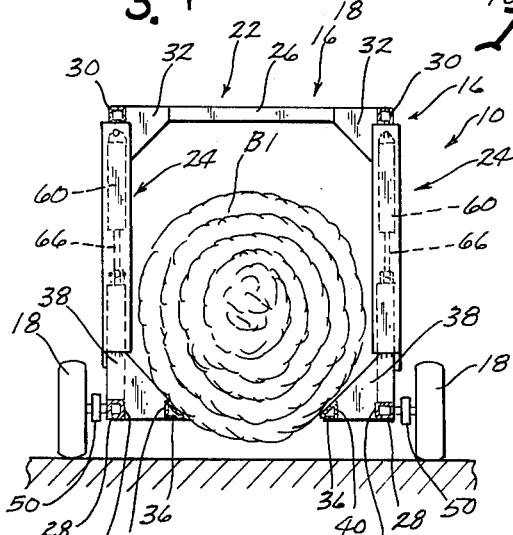
FIG. 3 is a sectional view taken on line 3—3 in FIG. 2.

The large round bale handling device of this invention, indicated generally at 10, is shown in FIGS. 1 and 2 attached to the usual draw bar 12 of a farm tractor vehicle 14. The bale handling device 10 includes an upstanding elongated frame, referred to generally by reference character 16, which frame is adjustably supported on ground wheels 18 and attached to the tractor 14 by a tongue 20.

The frame 16, as shown in FIGS. 1-4, is an elongated structure open at both ends and through the bottom. The upright opposite sides of the frame are connected together only at their upper ends. Frame 16 includes a plurality of longitudinally spaced inverted U-shaped frame sections 22 (FIG. 3) each having a pair of generally upright and transversely spaced legs 24 and an upper base member 26. The U-shaped frame sections 22 may be integral units or assemblies of separate parts as shown. The legs of adjacent U-shaped frame sections are connected at their lower ends by a pair of elongated frame side members 28 (FIG. 2), one on each side of the frame.

The upper ends of adjacent U-shaped frame sections are similarly connected by a pair of elongated top frame members 30 (FIGS. 2 and 3) which overlie and are fastened to upper ends of the legs 24 on respective sides of the frame.

To reinforce the resultant frame structure 16, a plurality of gussets 32 are employed along the top of the frame at the junctures between the legs 24, the U-frame base members 26 and the top frame members 30. The gussets 32 are welded or otherwise secured in position to prevent the legs 24 from spreading apart under the load of a bale. Similar gussets 34 (FIG. 2), which are longitudinally situated and secured at the connections between the top frame members 30 and the legs of the center U-shaped frame section, provide added strength to prevent longitudinal collapse of the frame.

The top of the frame thus is comprised of the top frame members 30 and the transverse upper base members 26 of the U-shaped frame sections 22. Likewise, each of the opposite sides of the frame include the legs 24 on the respective side as well as the frame side member 28.

Inwardly of the lower end of each side of the frame, there is supported a longitudinally extended side bale supporting ramp 36 (FIG. 3), the ramps being spaced transversely a distance apart to support opposite sides of a round bale B thereon with a lower side of the bale projected downwardly below the ramps. A pair of gussets 38 protrude laterally inwardly from the front and rear surfaces of the lower ends of each leg 24 to support the bale ramps 36.

The gussets 38 have cut out or notched lower corners 40 and 42 which conform to the periphery of the ramps 36 and frame side members 28 respectively to provide a long contact surface along which the gussets 38 may be welded or otherwise secured to these members. The top of the gussets 38 are also welded to the side members 28 as at 44 in FIG. 4 to prevent twisting of the frame side members 28 under the load of a bale on the rams 36.

Figure 6:
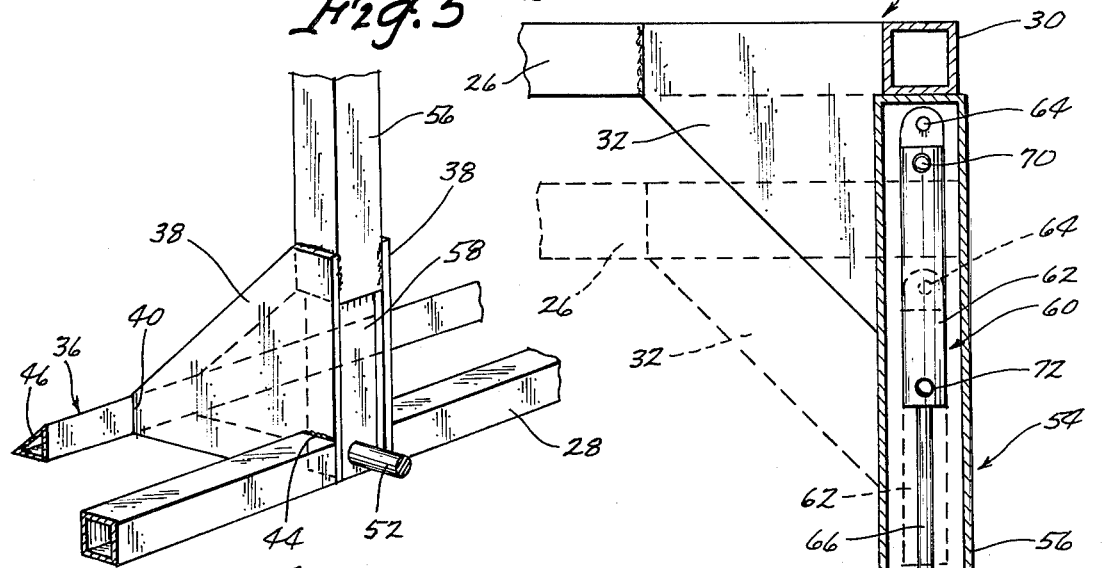
FIG. 6 is a detail perspective view of a part of the mechanism for adjustably lowering and raising the frame of the bale handling apparatus.

Each bale ramp 36 includes a downwardly and inwardly inclined bale engaging surface 46 (FIG. 6) and a tapered and downwardly inclined front end portion 48 (FIG. 1) which acts as a bearing surface or wedge for engaging a ground supported bale. The rear ends of the bale ramps 36 are similarly constructed to release the bales without damage.

Figure 4:
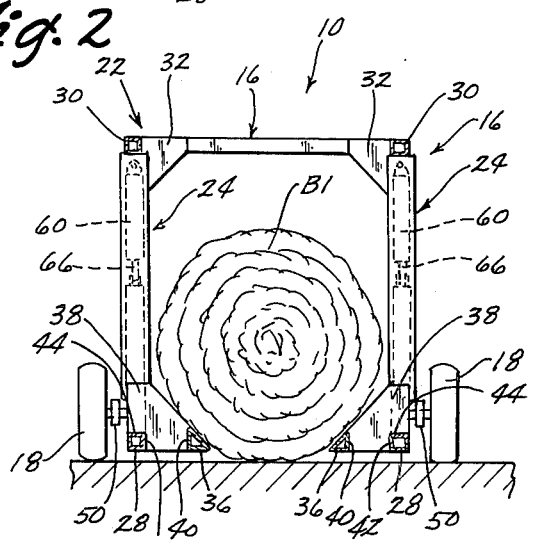
FIG. 4 is a sectional view similar to FIG. 3 but showing the frame in its lowered bale loading position.

The ramps 36 are transversely spaced apart far enough that they may be advanced along opposite sides of a ground supported bale with such little interference that the bale remains stationary as the ramps are advanced therealong. Referring to FIG. 4, it will be seen that only a central portion of a ground supported round bale B is in actual ground engagement. Accordingly, the bale ramps 36 may be axially inserted along opposite sides of the ground engagd central portion and yet sufficiently below the bale to lift it without damage. In this connection, it will be seen that there is no mechanical linkage or connection directly across the ramps which would interfere with longitudinal movement of the ramps relative to a ground supported bale.

Figure 5:
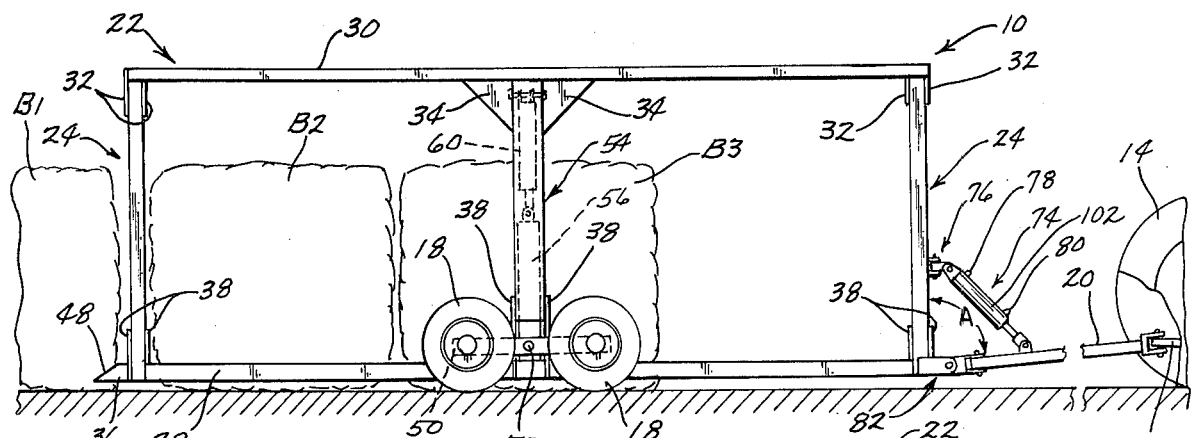
FIG. 5 is a side elevational view, illustrated similar to FIG. 2, showing the frame in its lowered position for unloading bales.

The overall frame is supported for up and down movement on at least one pair of transversely spaced ground wheels 18 (FIG. 1) which are mounted on the frame sides outwardly of the bale supporting ramps. FIGS. 1 and 5 show a pair of wheels 18 mounted in tandem on each side of the frame 16, each pair of wheels being rotatably mounted at opposite ends of a tandem axle support member 50 which itself is pivotally mounted on the outer end of a pivot shaft 52 protruding outwardly from the lower end of one of the U-shaped frame section legs 24.

Vertical movement of the frame relative to the wheels is provided for by a pair of vertically extensible legs 54 (FIG. 7) on a medial one of the U-shaped frame sections 22. Each leg 54 includes an upper portion 56 which is rigidly connected to the frame and a lower portion 58 to which the ground wheels 18 are connected. The pivot shaft 52 for the tandem axle support member 50 protrudes laterally outwardly from the lower end of the lower leg portion 58.

Both extensible leg portions 56 and 58 are rectangular tubes closed at the top and open at the bottom. The upper portion 56 is rigidly fastened to the top of the frame by gussets 32 and 34 as described above in connection with the other U-shaped frame section legs 24. Similarly, the bale carrying ramps 36 are supported on the upper portions 56 by a pair of the gusset plates 38. Note that in FIG. 6 the gussets 38 intercept the frame side member 28 to provide clearance for passing the lower leg portion 58 therethrough.

The means for connecting the upper and lower portions 56 and 58, respectively, is a telescopic connection, i.e., each lower leg portion 58 is receivable vertically into the upper leg portion 56 as the frame 16 is lowered relative to the ground support wheels 18.

Figures 7, 8:
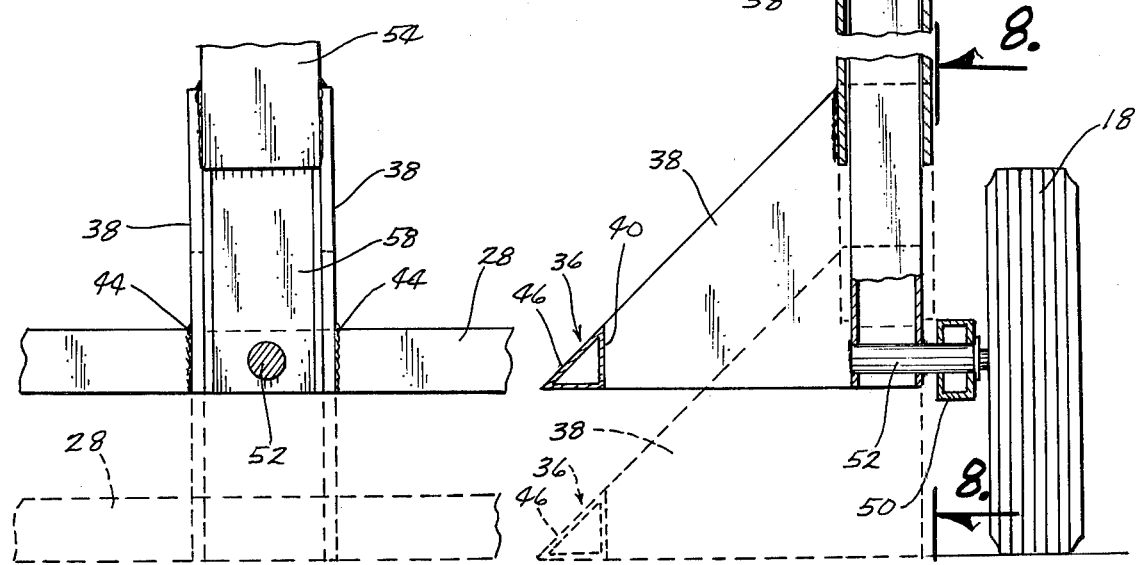
FIG. 7 is an enlarged sectional view taken on line 7—7 in FIG. 1 and showing the frame in the raised position therefor.
FIG. 8 is a sectional view taken along line 8—8 in FIG. 7.

To raise and lower the frame 16 with respect to the ground wheels 18, a power lift means is provided which consists of an extensible and retractible power unit such as the double acting hydraulic cylinder 60 shown in FIG. 7. Cylinder 60 is positioned within the interior of the upper leg portion 56 and has a base portion 62 pivotally connected to the upper leg member 56 at 64 and a piston rod 66, retractible within the base 62, pivotally connected to a bracket 68 which is fixed on the upper end of the lower leg portion 58. Hydraulic pressure lines (not shown) are connectable to the usual connectors 70 and 72 on the hydraulic cylinder base 62 for connection to the hydraulic system of the tractor 14.

The extent of vertical movement of the frame relative to the ground wheels is shown in FIG. 7. The dotted line position of the frame indicates the lowered bale loading position of the frame in which the bale carrying ramps 36 are in ground engagement or adjacent the ground for insertion under a ground supported bale. The solid line position of the frame in FIG. 7 represents the raised bale transport position in which cylinder 60 is fully extended and the ramps 36 are elevated off the ground a sufficient distance to provide clearance between a round bale carried on the ramps and the ground. Thus, the ramps 36 are raised approximately to the height of the tandem wheel support members 50.

Since the ground wheel assemblies support the frame at only a single longitudinal position, the frame tends to tilt or tip forward or backward unless the weight of the bales is exactly centered about the pivot shafts 52. At times, such as when loading a bale, it is desirable to tilt the frame forward slightly at about a five degree angle with the horizontal in order to slightly lift the bale as the side ramps are inserted along opposite sides of the bale. Similarly, it may be desirable to tip the frame backward when unloading a single bale carried on a rear portion of the side ramps. Accordingly, tilting means are extended between and connected to the frame 16 and tongue 20 for longitudinally inclining the frame on the wheel assemblies to an adjusted position. It will be seen that the frame is raised, the vertical angle A (FIGS. 2 and 5) between the frame and tongue 20 is widened in order to set the inclination of the frame and bale carrying ramps 36 parallel with the ground. On the other hand, as the frame is lowered to its bale loading position, the angle A is narrowed either to maintain the level orientation of the frame or to tip it slightly forward. This tilting action is accomplished by a double acting hydraulic cylinder 74 (FIG. 5) which is pivotally connected at one end at a medial position along the tongue 20 and pivotally connected at the other end as at 76 to the front of the frame above the tongue connection. Hydraulic cylinder 74 is provided with the usual inlet and outlet connectors 78 and 80 which are connectable by hydraulic lines (not shown) to the tractor's hydraulic system for operative control.

Figure 9:
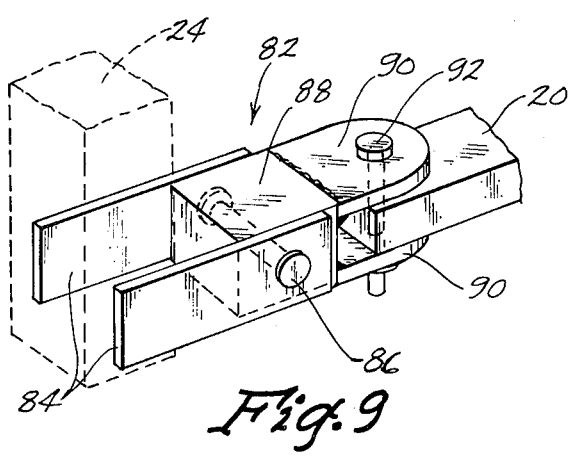
FIG. 9 is a detail perspective view of a universal joint that forms part of the apparatus tongue structure.

Since the bale carrying ramps 36 are inserted axially along opposite sides of a ground supported bale to load the same, it is necessary to offset the frame relative to the tractor so as to provide an unobstructed bale passage zone longitudinally through and in front of the side ramps for the bales to be loaded. Thus, one end of the tongue 20 is pivotally connected to the frame for both transverse and vertical movement of the other end relative to the frame. A universal joint 82 (FIG. 9) is adapted for this purpose. Joint 82 includes a pair of transversely spaced plates 84 attached to opposite sides of one of the U-shaped frame section legs 24 at the front of the frame. Pivotally mounted between plates 84 on a pivot pin 86 is a vertically pivotal hitch 88 which includes a pair of vertically spaced and forwardly protruding plates 90 with a pivot pin 92 inserted therethrough at an inclination perpendicular to pin 86. The rear end of the tongue 20 is inserted between plates 90 and secured by the pivot pin 92 being passed through aligned holes in the plates 90 and tongue 20, respectively.

Figure 10:
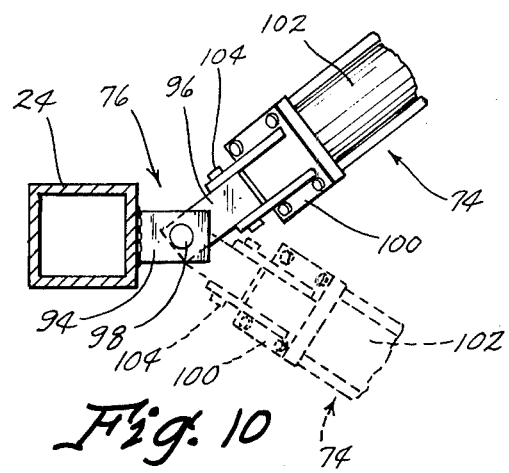
FIG. 10 is an enlarged sectional view taken on line 10—10 in FIG. 2 showing a portion of the frame tilting mechanism.

The universal joint connection between the tongue 20 and frame 16 further necessitates a similar universal connection 76 between the tilting means hydraulic cylinder 74 and the front of the frame 16. Referring to FIG. 10, therefore, a pair of vertically spaced plates 94 protrude forwardly from the front of the leg 24 to which the tongue is connected. A horizontally pivotable hitch member 96 is carried between plates 94 on a pivot pin 98, hitch member 96 being insertable between the usual fastening brackets 100 on the base end 102 of hydraulic cylinder 74 and retained therein by a pivot pin 104 insertable through aligned holes in the brackets 100 and hitch member 96. Thus, it can be seen that hydraulic cylinder 74 is free to pivot vertically about pin 104 and horizontally about pivot pin 98 from the solid line position indicated in FIG. 10 to the dotted line position.

To fix the horizontal inclination of the tongue 20 relative to the frame 16, a lock bar 106 (FIG. 1) is pivotally mounted on a suitable bracket on the side of the bale carrying ramp 36 nearest the tongue-to-frame connection 82. Lock bar 106 has a plurality of aligned holes 108 formed along it, any one of which may be set over a locking hole in the tongue 20 and secured thereon by a lock pin 110. Accordingly, the tongue 20 may be locked at various horizontal positions from the inwardly inclined position indicated in FIG. 1 to the outwardly inclined position indicated in FIG. 11.

Figures 11, 12:
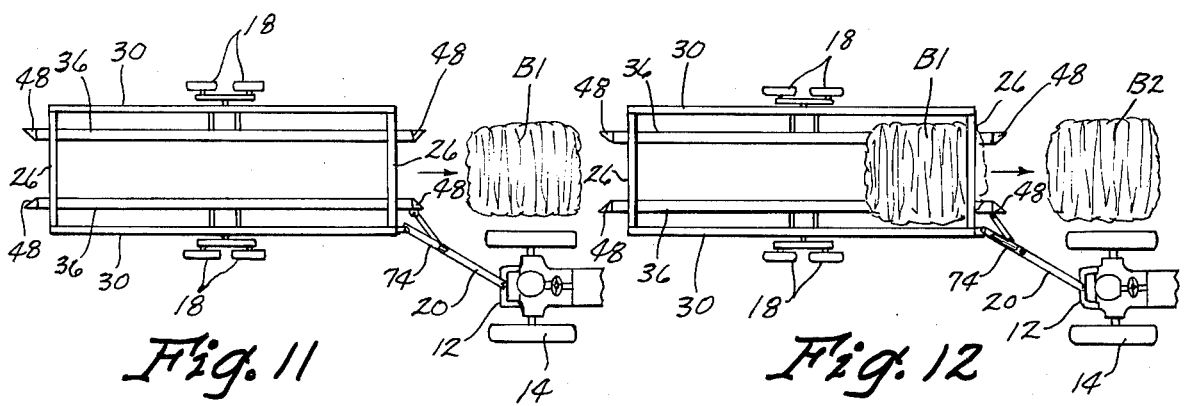
FIG. 11 is a diagrammatic view showing the loading of a first bale on the bale handling apparatus.
FIG. 12 diagrammatically shows the loading of a second bale on the apparatus.
Figure 13:
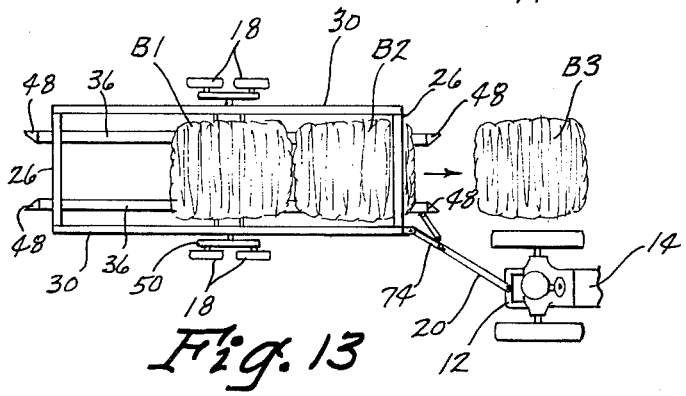
FIG. 13 diagrammatically illustrates the loading of a third bale on the bale handling apparatus.

Operation of the round bale handling device 10 of the present invention to load and transport large round bales is accomplished by first fixing tongue 20 in its outwardly inclined position (FIG. 11) and then driving the tractor 14 in a forward direction with the bale handling device of the present invention being towed in transversely offset relation behind and to one side of it. The tractor is driven to a position alongside a ground supported bale B1 so that the frame 16 is longitudinally aligned with the axis of the bale and the open front end of the frame is positioned adjacent one end of the bale as shown in FIG. 11. At this point, the hydraulic cylinders 60 (FIG. 7) in the extensible legs 54 are actuated to retract the cylinder rods 66 thereby lowering the frame to its lowered bale loading position. Cylinder 74 is actuated at the same time either to maintain the level inclination of the ramps or to tip them forward slightly. The tractor pulls the frame forward over and around the bale with the transversely spaced bale ramps being inserted below and to opposite sides of the bale. Upon actuation of the cylinders 60 to raise the frame to its bale transport position, the round bale B1 is lifted on the bale ramps out of ground engagement for transport on the frame. The tractor may then be driven in a continuous forward direction alongside a second ground supported bale B2 (FIG. 12), again aligning the frame with the axis of the bale. With the frame again lowered to its bale loading position, the frame may be pulled forward to receive the second bale B2 in its open front end. Note that as the frame is pulled forward, the first bale B1 is automatically positioned rearwardly on the ramps 36 since it remains stationary in ground engagement. Even if the first bale B1 is slightly elevated on the forwardly tilted ramps, it is automatically pushed rearwardly upon contacting the fully ground supported second bale B2. The frame is again simultaneously levelled and raised to its bale transport position so that it may be towed into position for loading a third bale B3, as indicated in FIG. 13, to fully load the bale hauler as shown in FIG. 1.

The loaded frame may be transported in transversely offset relation behind the tractor through fields, but to permit passage through narrow gates and on highways, it is necessary that the bale handling device be aligned directly behind the towing vehicle. Accordingly, pin 110 (FIG. 1) is removed from the tongue and lock bar 106 allowing the tongue to be pivoted to an inwardly inclined position at which lock pin 110 may be reinserted to again fix the horizontal inclination of the tongue.

When the bales are to be unloaded, it is only necessary to lower the ramps to their lowered position and drive the tractor away. Since lowering of the frame returns the lower sides of the bales to ground engagement, the ramps are disengaged from the bale and movable in a forward direction longitudinally of the bales to unload them.

Accordingly, the degree of tractor manipulation required for handling the large round bales is minimized with the bale handling device of the present invention since only forward motion of the bale handling device is required for loading, transporting and unloading bales. The resulting operation is both faster and easier than was previously possible with prior known devices. In addition, damage to the bales is minimized since the entire bale handling operation requires neither piercing of the bales nor movement of the bales on chains or the like.

Although the invention has been described with respect to a peferred embodiment thereof, it is to be understood that it is not to be so limited since changes and modifications can be made therein which are within the full intended scope of this invention as defined by the appended claims.

I claim:

1. A device for handling large round bales comprising:
    a. an elongated portable frame including a pair of transversely spaced opposite longitudinally extended side members,
    b. a pair of elongated bale supporting ramps corresponding to said side members spaced transversely a distance apart to support opposite bottom portions of a round bale thereon,
    c. means rigidly securing each bale supporting ramp to a respective frame side member at a position inwardly thereof,
    d. means connecting the side members together to provide a longitudinally extended unobstructed bale passage zone between said supporting ramps, said zone having an open front end and an open rare end,
    e. hitch means having one end connected to the portable frame and the other end connectable to a towing vehicle,
    f. a pair of transversely spaced ground wheel assemblies, one on each side of the frame located outwardly of an adjacent side member,
    g. means movably supporting the frame on the ground wheel assemblies for up and down tilting movement, and
    h. power lift means for raising and lowering the frame between a raised bale transport position and a lowered bale loading position,
    i. said frame, when in the lowered bale loading position, being movable in a forward direction axially of a ground supported round bale to receive a bale within the front end of said bale passage zone and between said side ramps whereby, on actuation of the power lift means the round bale is lifted on the side ramps to said transport position said round bale on movement of the frame from the transport position to the bale loading position being unloaded from the open rear end of the bale passage zone on movement of the frame in the forward direction.

2. A device for handling large round bales, according to claim 1, wherein:
    a. said means connecting the side members includes a plurality of longitudinally spaced inverted U-shaped frame sections.

3. A device for handling large round bales, according to claim 1, comprising:
    a. tilting means for longitudinally including the frame on the wheel assemblies to an adjusted position.

4. A device for handling large round bales, according to claim 3, wherein:
    a. said one end of the hitch means is movably connected to the frame for both transverse and vertical movement of said other end relative to the frame.

* * * * *